United States Patent [19]

Antonello et al.

[11] Patent Number: 5,862,469
[45] Date of Patent: Jan. 19, 1999

[54] METHOD AND APPARATUS FOR TRANSMITTING METERING PULSE INFORMATION TO A WIRELESS PUBLIC CALL OFFICE

[75] Inventors: Gordon Antonello; Simon DeAlmeida, both of Calgary, Canada

[73] Assignee: Harris Canada, Inc., Calgary, Canada

[21] Appl. No.: 619,373

[22] Filed: Mar. 21, 1996

[51] Int. Cl.$^6$ .................................................. H04Q 7/20
[52] U.S. Cl. ...................... 455/405; 455/406; 455/412; 455/550
[58] Field of Search ...................... 455/405, 412, 455/406, 466, 462, 418, 411, 550, 417, 445, 408; 395/290; 379/111

[56] References Cited

U.S. PATENT DOCUMENTS

| | | | |
|---|---|---|---|
| 3,810,100 | 5/1974 | Hungerford et al. ................... | 395/290 |
| 4,485,270 | 11/1984 | Honda et al. . | |
| 4,829,517 | 5/1989 | Malek . | |
| 4,845,740 | 7/1989 | Tokuyama et al. ..................... | 455/406 |
| 5,172,407 | 12/1992 | Alenius . | |
| 5,291,543 | 3/1994 | Freese et al. . | |
| 5,339,352 | 8/1994 | Armstrong et al. . | |
| 5,361,297 | 11/1994 | Ortiz et al. . | |
| 5,425,083 | 6/1995 | Furuya et al. . | |
| 5,463,671 | 10/1995 | Marsh et al. ........................... | 379/56.1 |
| 5,475,735 | 12/1995 | Williams et al. ....................... | 455/403 |
| 5,495,518 | 2/1996 | Hayashi ................................. | 455/550 |
| 5,561,706 | 10/1996 | Fenner .................................. | 455/406 |
| 5,577,100 | 11/1996 | McGregor et al. ..................... | 455/406 |
| 5,577,101 | 11/1996 | Bohm ..................................... | 455/406 |
| 5,594,739 | 1/1997 | Lemieux ................................ | 370/350 |
| 5,625,884 | 4/1997 | Gitlin et al. ............................ | 455/406 |
| 5,631,946 | 5/1997 | Campana, Jr. et al. ................ | 455/412 |
| 5,684,861 | 11/1997 | Lewis et al. ........................... | 455/405 |

FOREIGN PATENT DOCUMENTS

| | | |
|---|---|---|
| 2046556 | 11/1980 | United Kingdom . |
| 9520298 | 7/1995 | WIPO . |

OTHER PUBLICATIONS

Mach, "Digital Radio Standards Differences", Mobile Radio Technology, Jul. 1997.

*Primary Examiner*—William Cumming
*Attorney, Agent, or Firm*—Cesari and McKenna, LLP

[57] ABSTRACT

Metering pulses from a local exchange are received by a wireless local loop (WLL) which computes the metering pulse rate. A value indicative of the metering pulse rate is then placed into a message which is transmitted from the WLL to a wireless public office (PCO), also referred to as a village public telephone. The wireless PCO reads the message to determine the metering pulse rate value and then generates PCO metering pulses at the metering pulse rate value. Advantageously, once the wireless PCO has properly received the metering pulse rate value, no additional metering pulse information is required to be sent to the PCO unless the metering pulse rate value changes during the call. Therefore, there are no further interruptions to the speech or data on the forward voice channel in order to transmit metering pulse information to the PCO.

14 Claims, 6 Drawing Sheets

METHOD AND APPARATUS FOR TRANSMITTING METERING PULSE INFORMATION TO A WIRELESS PUBLIC CALL OFFICE

FIELD OF THE INVENTION

This invention relates to a wireless communication system, and in particular to a wireless local loop which provides metering pulse information to a wireless public telephone.

BACKGROUND OF THE INVENTION

In many telephone systems, a metering pulse indicative of a predetermined monetary value is sent from a local exchange (LE) over a landline (e.g., an electrical or fiber-optic cable) to the telephone which initiates the call to allow a user to monitor the cost of the call as it progresses. The rate at which the LE transmits the metering pulses varies depending on the rate per minute of the call. For a local call, the metering pulses may be spaced several minutes apart (e.g., three minutes) since the cost per minute is relatively inexpensive, whereas, for a more expensive long distance call, the metering pulses may be separated by only several seconds. These pulses are typically either 12 KHz or 16 KHz audio tones each lasting between 120–180 milliseconds, and in general, the rate of the metering pulses is constant once a call has been initiated.

Metering pulses are widely used in village public telephones (VPTs) which include public pay telephones and small businesses that provide telephone services. In localities where not every home has a telephone, these small businesses (referred to hereinafter as public call offices or PCOs) are quite popular. PCOs include processing equipment which counts the metering pulses received during a call and calculates the price of the call based upon the number of metering pulses received during the call. In some cases the current cost of the call is displayed to the user during the call. Once the call is completed the customer pays the operator of the PCO. Public pay telephones on the other hand require the user to pay in advance, and when the amount deposited by the user has been used, the user deposits additional money to continue the call.

Wireless (e.g., cellular) PCOs also exist for use in remote locations where wireline telephone service does not exist. However, a problem with current wireless communication is that the bandwidth of a wireless communication channel (i.e., the forward voice channel) is less than the bandwidth of a wireline channel. That is, frequencies outside the 300–3,000 Hz band are heavily attenuated, thus the 12 or 16 KHz metering pulse frequency will not be allowed to pass through to the PCO unit. Bandshifting the metering pulses to a lower frequency has proven to be impractical since the bandshifted signal is within the passband of the voice or data on the forward voice channel and thus is audible to the user. Filtering the bandshifted signal from the passband is impractical since it reduces the audio bandwidth, resulting in the loss of some speech information or data transmitted on the wireless channel.

Because of these problems, current wireless public pay telephone and PCOs generate their own metering pulses based on locally administered rate tables, which are neither synchronized nor tied to the metering pulses issued by the LE. Consider, for example, the wireless system disclosed in U.S. Pat. No. 5,361,297 which maintains a database of billing rate information for local and long distance telephone calls. The wireless pay telephone or PCO uses this billing rate information to generate its own local metering pulses once the outgoing call has been answered. A problem with this autonomous generation of the metering pulses is that each time the billing rates change for the LE, every wireless public pay telephone and PCO must have its internal billing rate information updated. This can lead to errors and it presents opportunities for billing rate changes to made by someone other than the authorized LE operator.

One approach for overcoming these problems is set forth in PCT application WO 95/20298 entitled "Method for Transmitting Tariff Data to a Subscriber Unit", published Jul. 27, 1995. This published application discloses accumulating metering pulses at a telecommunications network, and when the accumulated number of pulses exceeds a predetermined value, a lump sum value is transmitted from the telecommunication network via a radio signal to a subscriber unit. The transmission of the lump sum value to the subscriber units occurs regularly during the call and the transmission causes an interruption in the speech path (see pg. 3, lines 28–33). Hence, this approach is still problematic since it causes interference with the speech path, but does so less frequently in comparison to other prior art systems. Nonetheless, any interruption in the speech path inconveniences the parties' to a call and may cause the loss of data.

Therefore, there is a need for a wireless communication systems that is capable of providing metering pulse information from a LE to a wireless public call office without regularly interfering with the speech path.

An object of the present invention is to provide metering pulse information from a LE to a wireless PCO.

SUMMARY OF THE INVENTION

Briefly, according to the present invention, in a wireless communications system, metering pulses from an LE are received by a wireless local loop (WLL) which computes the metering pulse rate. A value indicative of the metering pulse rate is then placed into a message which is transmitted from the WLL to a wireless PCO over the forward voice channel. The wireless PCO reads the message to determine the metering pulse rate value and then generates PCO metering pulses at the metering pulse rate value. The wireless PCO counts the metering pulses during a call, and once the call is completed it computes the cost of the call based upon the accumulated number of pulses.

Specifically, once a call originating from the wireless PCO is answered, the LE starts sending metering pulses (e.g., a 12 or 16 KHz audio tones) to the WLL over a dedicated land line (e.g., a two wire line). Once enough metering pulses have been received, the WLL computes the metering pulse rate and provides the metering pulse rate signal value indicative thereof. A rate message whose rate field is set equal to the metering pulse rate signal value is then transmitted to the wireless PCO over the forward voice channel.

The metering pulse rate value is used by the wireless PCO to generate its own metering pulses. The WLL continues to monitor the metering pulses from the LE during the call, and if the rate changes (e.g., it goes from the day rate to the night rate during the call) it transmits another rate message with the new metering pulse rate which the wireless PCO uses to reset the metering pulse rate.

The protocols for communicating between the WLL and the PCO may include any of the well known analog and digital wireless communication protocols such as the analog cellular telephone protocols Extended Total Access Communications System (ETACS) or Extended Advanced Mobile Phone Systems (ELAMPS). Each of these protocols provides a forward voice channel for transmitting voice and data in a frequency modulated (FM) signal, and allows control messages to be transmitted over the forward voice channel.

The WLL transmits messages over the forward voice channel by first muting the speech or data being transmitted on the channel and then transmitting the message. The transmission of speech or data across the forward voice channel resumes once the message has been transmitted.

An advantage of the present invention is that it facilitates providing metering pulse information from a LE to a wireless PCO without regularly interfering with the speech or data which is transmitted on the forward voice channel. That is, once the WLL has established the rate of the metering pulses, it transmits a message to the wireless PCO comprising the metering pulse rate value. The wireless PCO then generates its own metering pulses at a rate equal to the metering pulses generated by the LE. Advantageously, once the PCO has properly received the metering pulse rate value, no additional metering pulse information is required unless the metering pulse rate value changes during the call. Therefore, there are no further interruptions to the speech or data on the forward voice channel in order to transmit metering pulse information.

Another advantage is that the metering pulse rate value used by the wireless PCO is based upon the actual interval between the metering pulses received from the LE. This ensures that the metering pulses generated at the wireless PCO duplicate the metering pulses generated by the LE.

These and other objects, features and advantages of the present invention will become more apparent in light of the following detailed description of preferred embodiments thereof, as illustrated in the accompanying drawings.

DESCRIPTION OF A PREFERRED EMBODIMENT

Figure 1:
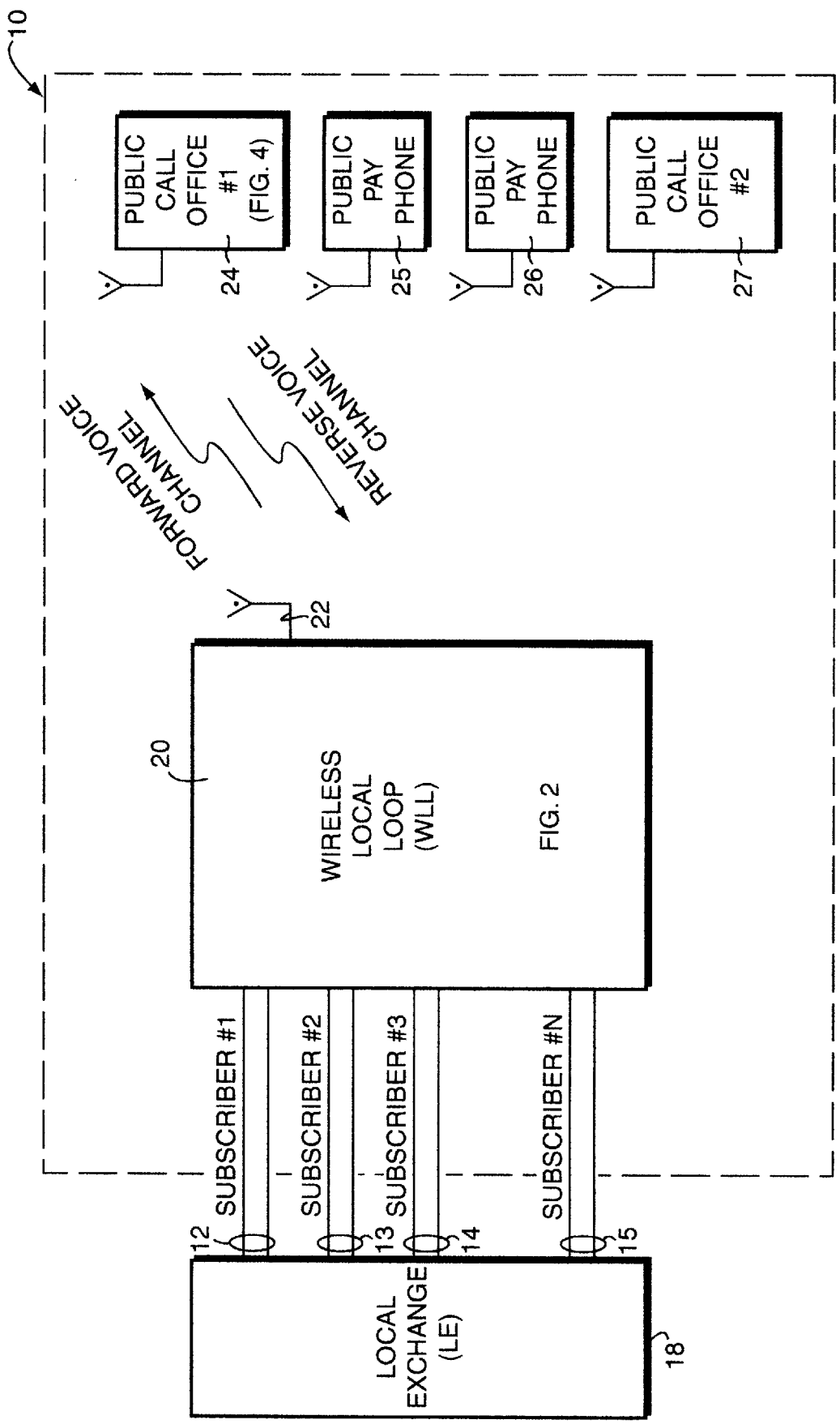
FIG. 1 is a block diagram illustration of a wireless communication system comprising a wireless local loop (WLL) and a public call office (PCO)

FIG. 1 illustrates a functional block diagram of a wireless communication system 10 which receives a plurality of telephone signals via landlines 12–15 from a telephone local exchange (LE) 18. The system 10 includes a wireless local loop (WLL) 20 which receives the telephone signals on the landlines 12–15, and if an active call is present on one of the landlines, it translates the landline signal to a properly formatted radio signal which is radiated by an antenna 22 to subscribers 24–27 (often referred to generically as "mobile units"). Each subscriber receives the radio signal and determines if the signal is for them. The subscribers 24–27 may include for example a first PCO 24, public pay telephones 25–26 and a second PCO 27.

For each subscriber 24–27 there is a landline between the LE 18 and WLL 20 which is dedicated to that subscriber. For example, the landline 12 may be uniquely associated with the first PCO 24, while the landline 13 may be associated with the public pay telephone 25. Therefore, if a user in the first PCO 24 originates a call, a radio signal is sent to the WLL and the WLL recovers the information content of the signal and places a signal indicative thereof on the landline 12. Similarly, a call directed to the first PCO 24 is carried along the landline 12 to the WLL where it is translated to a radio signal and transmitted.

Whenever the LE determines that a PCO or a public telephone is originating a call, it determines the cost per unit time for the call and starts generating metering pulses indicative of that cost per unit time. The metering pulses are then sent as 12 or 16 KHz tones on the landline associated with the PCO or public pay phone which originated the call.

The wireless communications protocol employed to transmit radio signals between the WLL and a subscriber unit may be any suitable digital or analog communications technique. For example, suitable analog communication techniques include those described in the known ETACS and EAMPS protocols. Detailed information regarding the ETACS protocol is set forth in the ETACS Air Interface Standard which may be obtained from The Secretary to the Technical Director, Vodafone Ltd., The Courtyard, 2-4 London Road, Newbury, Berkshire, RG13 1Jl ENGLAND. The present invention will be discussed with respect to an analog communications system embodiment which employs the ETACS protocol. However, it will be apparent to one of ordinary skill that the present invention is clearly not so limited and that any wireless communications protocol may be used.

To transmit a message to a wireless subscriber over an assigned forward voice channel, the voice or data transmission over the forward voice channel is muted and the message is modulated with a sub-carrier (e.g., 10 KHz) and transmitted over the assigned forward voice channel. Once the message has been transmitted, the transmission of voice or data over the forward voice channel resumes.

Figure 2:
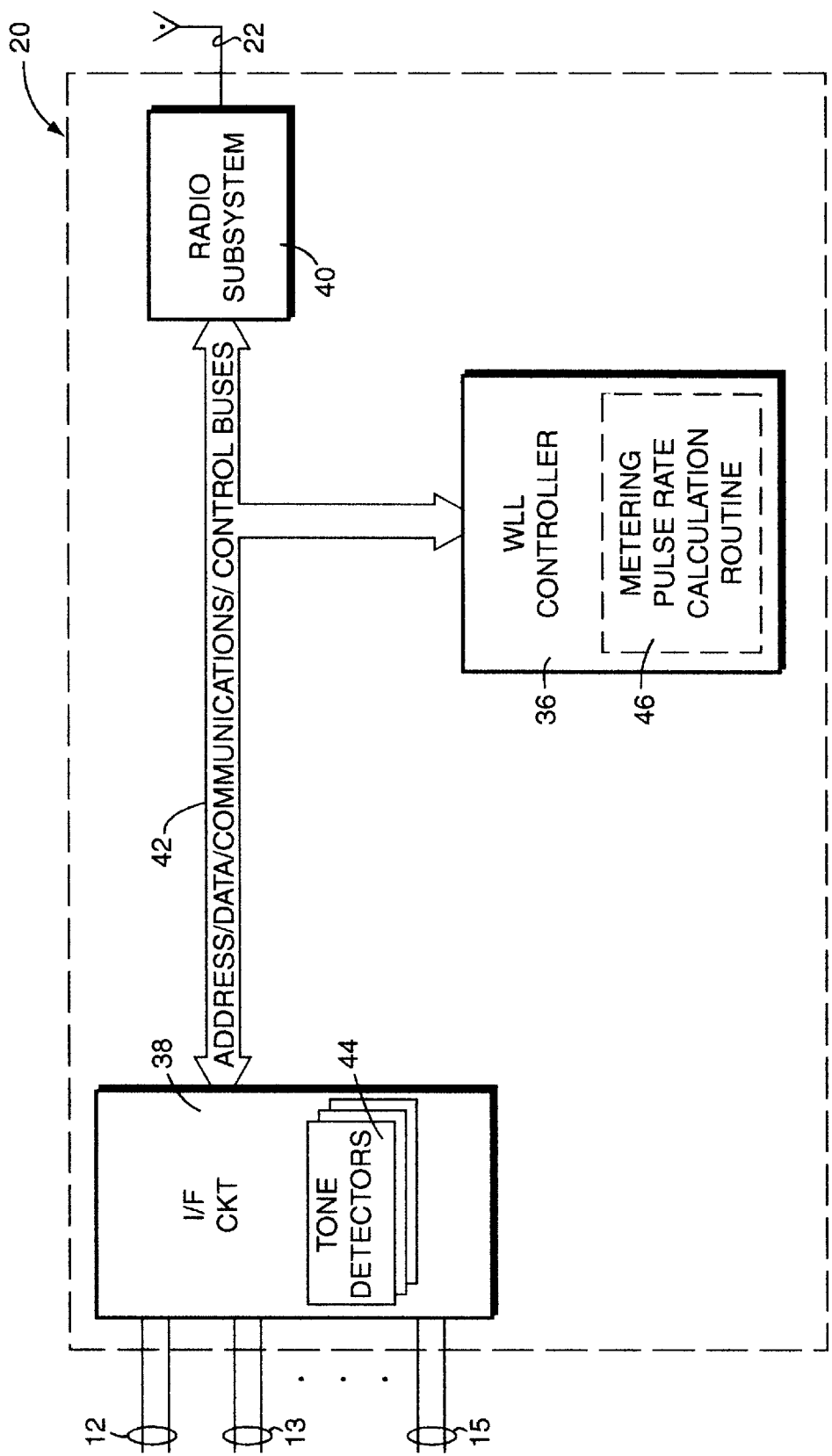
FIG. 2 is a block diagram illustration of the WLL.

FIG. 2 is a block diagram illustration of the WLL 20. The WLL includes a controller 36, an interface (I/F) circuit 38 and a radio sub-system 40 interconnected via an address bus, a data bus, a communication bus and control signals collectively shown for ease of illustration as an address/data/communication/control bus 42. The I/F circuit 38 receives the landline metering pulse signals from the LE and converts each signal from analog to digital. The digital signal is then accessible to the controller 36 for processing, and to the radio sub-system 40 for transmission. The I/F circuit 38 also includes a plurality of tone detectors 44 which are preferably dynamically assignable to an associated one of the plurality of landlines to detect 12 and 16 KHz audio tones associated with metering pulses received from the LE.

The controller 36 may be an industrial personnel computer (PC) comprising a microprocessor such as the Intel 80486, and non-volatile and volatile memory for storage of executable software routines and scratchpad values, respectively. Alternatively, the controller may include an embedded controller along with non-volatile and volatile memory. According to the present invention, the controller 36 also includes a metering pulse rate calculation routine 46.

Figure 3:
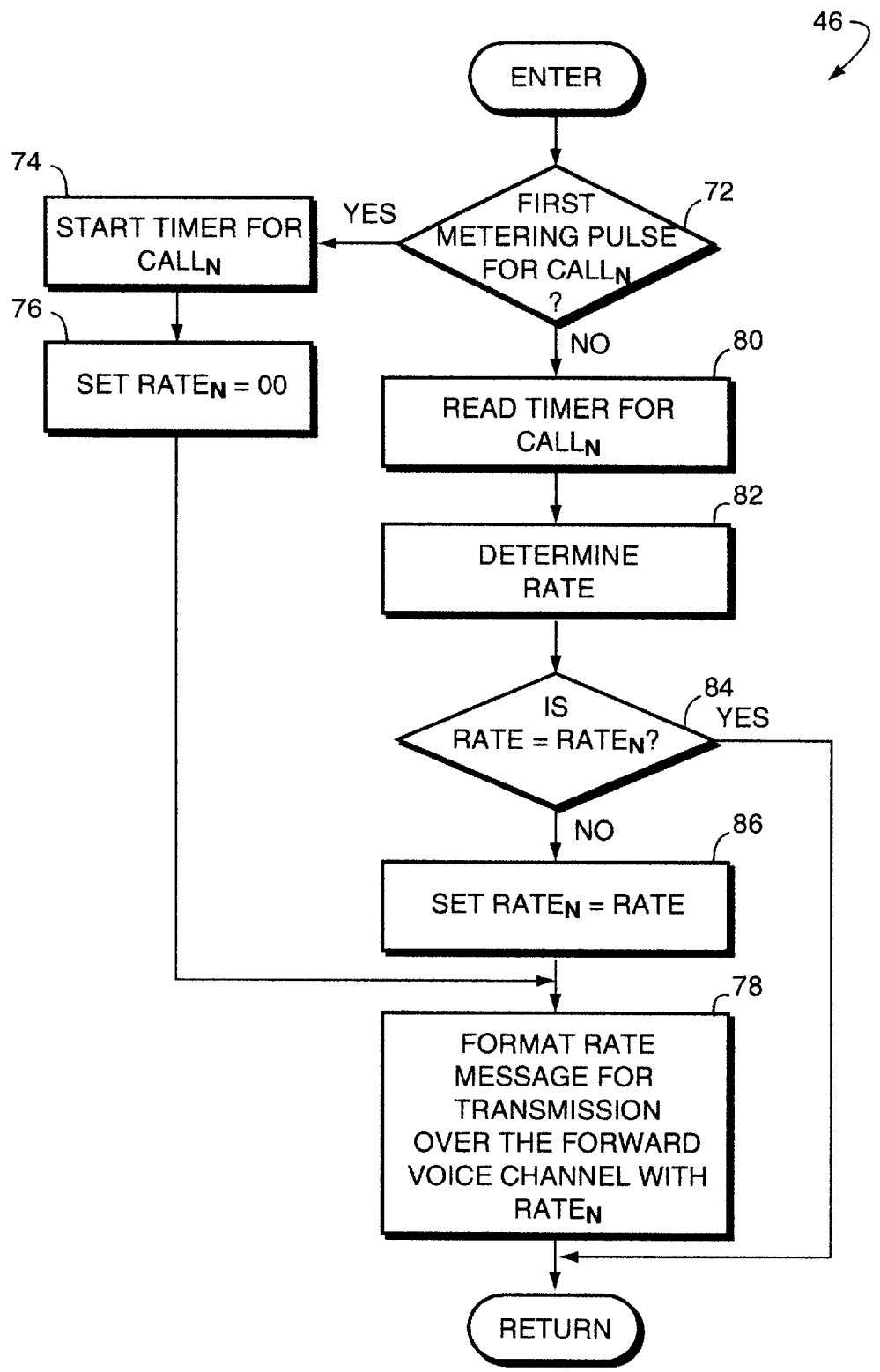
FIG. 3 is a flow chart illustration of the processing steps performed by the WLL to determine the pulse rate of metering pulses received from the LE and transmit a message including the pulse rate to the PCO.

FIG. 3 is a flow chart illustration of the metering pulse calculation routine 46 executed by the WLL controller 36 (FIG. 2) upon the detection of a metering pulse by the I/F circuit 38. The first step is a test 72 to determine if the metering pulse received by the I/F circuit 36 (FIG. 2) is the first metering pulse for the associated call. If it is, then step 74 is executed to start a metering pulse rate timer for that call which may be implemented either in software or hardware. Step 76 is performed next to set the metering pulse rate value equal to zero, followed by step 78 which formats a rate message containing the metering pulse rate value and transmits the message to the PCO or public pay phone which initiated the call.

The ETACS protocol has a mobile station control message which can be transmitted from a base station (i.e., the WLL) to a wireless subscriber over the forward voice channel. This message is transmitted over the forward voice channel and defined as a MOBILE STATION CONTROL MESSAGE type CHARGE RATE ORDER. The message is forty bits which includes twenty-eight information bits and twelve parity bits. Included within the twenty-eight bit information field is a five bit ORDER field, a three bit ORDQ field and a five bit LOCAL field. To define the message as type CHARGE RATE ORDER, the ORDER field is set to 101XX binary, where X is a don't care. The remaining eight bits in the ORDQ and LOCAL fields and the two unused bits in the ORDER field provide ten bits which are used to define the metering pulse rate.

If the metering pulse was not the first pulse received for the call, then step 80 is executed to read the value of the timer (not shown) which represents the amount of time between receipt of the first and second metering pulse at the I/F circuit 38 (FIG. 2). In some applications Step 82 is then executed to compute the metering pulse rate followed by a test 84 to determine if the new rate is equal to the old rate. If it is then execution of the routine is complete. Otherwise, the metering pulse rate value is set equal to the new computed rate in step 86 and the rate is transmitted over forward voice channel in step 78.

In general, transmission of the charge rate message over the forward voice channel (i.e., step 78) occurs upon receiving the first metering pulse, when the metering pulse rate is first computed for a call, and whenever the rate changes during the call. Advantageously, as long as the rate remains the same during the call, the transmission of voice or data across the forward voice channel will not be interrupted for the transmission of metering pulse information.

Attention is drawn to the fact that the metering pulse rate may be computed based upon the time difference between more than two metering pulses. For example, the time difference between the first and third metering pule may be computed and divided by two. In this embodiment, a rate message whose metering rate value is zero is transmitted to the PCO upon receiving the first and second metering pulses, and a rate message containing the computed metering pulse rate would be transmitted following receipt of the third metering pulse.

Figure 4:
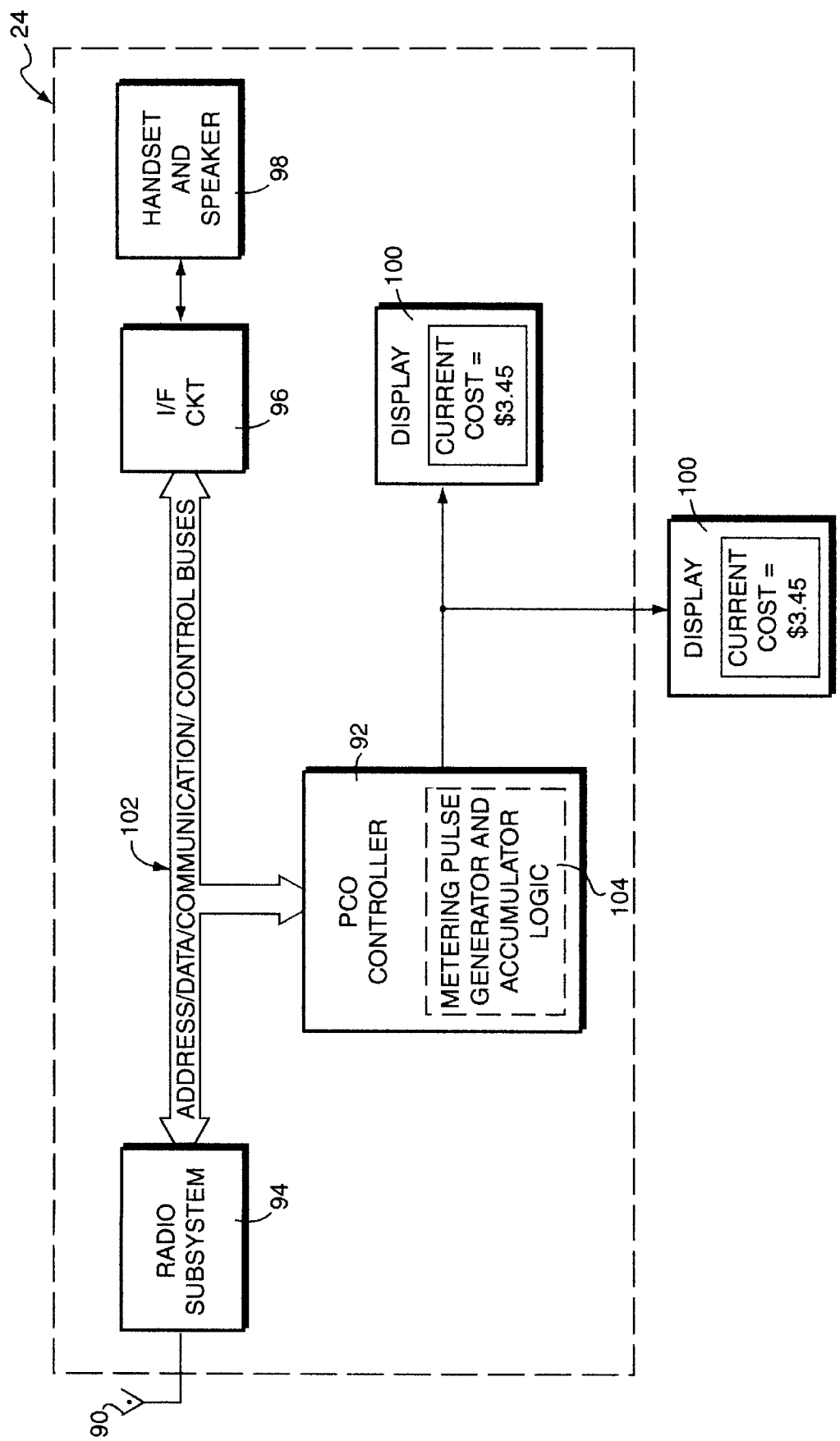
FIG. 4 is a block diagram illustration of a public call office.

FIG. 4 is a block diagram illustration of the first PCO 24 which includes an antenna 90 which receives radio signals from and radiates radio signals to the WLL 20 (FIG. 2). The PCO 24 includes a controller 92, a radio sub-system 94, an interface (I/F) circuit 96, a telephone handset and speaker 98 and a display 100 which may be located with the PCO 25 or external to it (both are shown). The PCO controller 92, radio sub-system 94 and I/F circuit 96 are interconnected via an address bus, a data bus, a communications bus and control signals collectively shown for ease of illustration as an address/data/communications/control bus 102. The radio sub-system 94 includes a transceiver (not shown) which recovers the received information and provides the data to the PCO controller 92 and the I/F circuit 96. According to the present invention, the PCO controller 92 also includes a metering pulse generator and accumulator routine 104.

Figure 5:
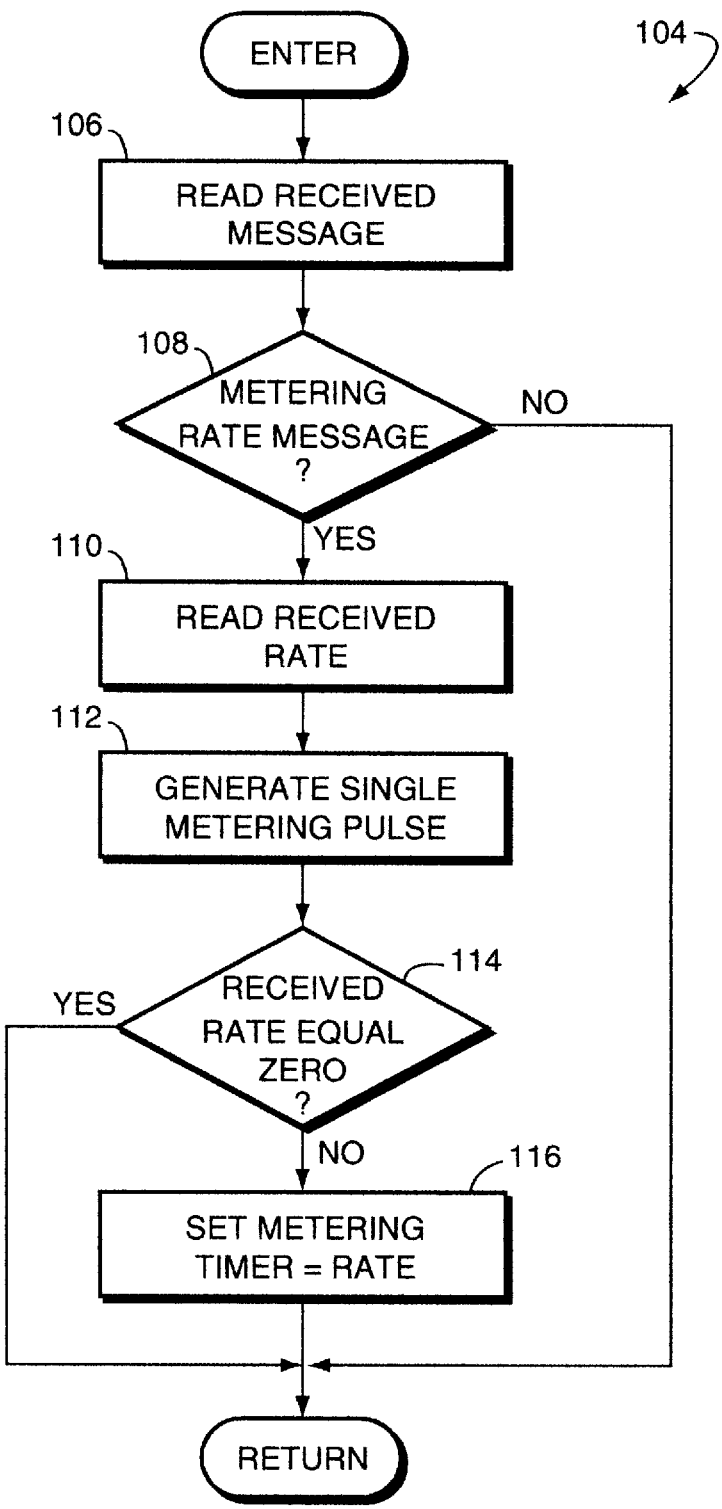
FIG. 5 is a flow chart illustration of the processing steps performed by the PCO to read messages from the WLL and to recover the metering pulse rate value in each message.

FIG. 5 is a flow chart illustration of the metering pulse generator and accumulator routine 104 executed by the PCO controller 92 (FIG. 4) upon the controller's receipt of a message over the forward voice channel. The controller first executes step 106 to read the message and then performs a test 108 to determine if the message is a charge rate message. This is performed by checking if the three most significant bits in the ORDER field of the received message are 101 binary. If they are, step 110 is performed to recover the ten bits of metering pulse rate information in the message. Next step 112 is performed to increment the PCO metering pulse accumulator. A test 114 is then performed to determine if the metering pulse rate is equal to zero, and if it is not, step 116 is performed to set-up (i.e., initialize) the PCO metering pulse timer to increment the metering pulse accumulator at a rate equal to the received metering pulse rate.

Figure 6:
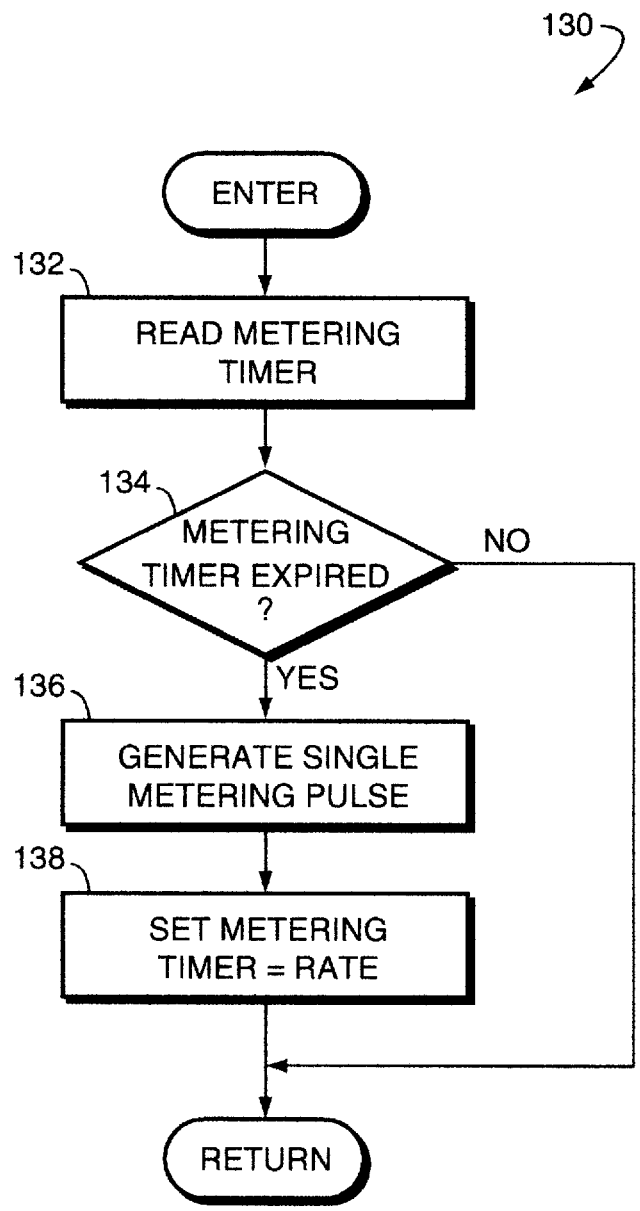
FIG. 6 is a flow chart illustration of the processing steps performed by the PCO to determine when to increment the metering pulse accumulator.

To determine if the timer has timed out, the PCO controller executes a time monitoring routine 130 as shown in FIG. 6. The routine 130 first executes a step 132 to read the PCO metering pulse timer. A test 134 is then performed to determine if the timer has timed out. If it has, then step 136 is executed to increment the PCO metering pulse accumulator. Step 138 is then performed to reset the PCO metering pulse timer to increment the metering pulse accumulator at a rate equal to the received metering pulse rate information.

To ensure that the PCO has properly received the message comprising the metering pulse rate, the PCO may respond to the WLL on the reverse voice channel with a REVERSE VOICE CHANNEL MESSAGE with the "T" field set to "1". This identifies the message as a confirmation of the CHARGE RATE ORDER message received by the PCO.

Although the present invention has been shown and described with respect to a preferred embodiment thereof, it should be understood by those skilled in the art that various other changes, omissions and additions to the form and detail thereof may be made therein without departing from the spirit and scope of the invention.

What is claimed is:

1. A wireless local loop which receives a metering pulse signal on a landline from a local exchange, and transmits a message including a metering pulse rate signal value to a wireless public call office, the wireless local loop comprising:

means for receiving metering pulses from the local exchange;

means for computing the rate of the metering pulses and for providing a metering pulse rate signal value indicative thereof;

means for encoding a message which comprises a data field comprising said metering pulse rate signal value; and means for transmitting said message over a wireless communication channel to the public call office.

2. The wireless local loop of claim 1, wherein said means for transmitting comprises means for transmitting said message over a forward voice channel of said wireless communication channel.

3. The wireless local loop of claim 1, wherein said means for computing comprises means for calculating the time between two consecutive metering pulses detected by said means for receiving.

4. A wireless local loop which receives a metering pulse signal on a landline from a local exchange, and transmits a message including a metering pulse rate signal value to a wireless public call office, the wireless local loop comprising:

means for receiving the metering pulse signal, for detecting the presence of a tone of a predetermined frequency indicative of a metering pulse, and for providing a received signal upon detection of said metering pulse;

means responsive to said received signal, for determining the time between the detection of consecutive metering pulses, and for determining a metering pulse rate signal value;

means for encoding the message with said metering pulse rate signal value; and means for transmitting the message to the wireless public call office over a wireless communication channel.

5. The wireless local loop of claim 4, wherein said means for receiving includes a metering pulse tone detector.

6. The wireless local loop of claim 5, further comprising means for receiving an acknowledgment message from the public call office indicating that the public call office has properly received said message.

7. The wireless local loop of claim 6, wherein said means for transmitting includes a radio transmitter which radiates said message over a forward voice channel of an analog cellular communications system.

8. A method of providing metering pulse information from a local telephone exchange to a wireless public call office using a wireless local loop, the method comprising the steps of:

receiving metering pulses from the local telephone exchange;

computing the rate of the metering pulse and providing a metering pulse rate signal value indicative thereof;

encoding a message which comprises a data field comprising said metering pulse rate signal value; and transmitting said message over the wireless communication channel to the public call office.

9. The method of claim 8, further comprising the step of:

generating at the public call office, a public call office metering pulse signal at a rate which is set by the value of said metering pulse rate signal in said message.

10. The method of claim 8, wherein said step of transmitting comprises the step of transmitting said message over a forward voice channel.

11. The method of claim 10, wherein said step of computing comprises the step of calculating the time between a plurality of consecutive metering pulses.

12. The method of claim 11, wherein said step of receiving comprises the step of receiving a first metering pulse once the call has been answered;

receiving a second metering pulse, consecutive to said first metering pulse.

13. A wireless communications system which receives a metering pulse signal on a landline from a local exchange, and transmits a rate message including a metering pulse rate signal value, the wireless communications system loop comprising:

A. a wireless local loop, comprising
A1. means for receiving metering pulses from the local exchange;
A2. means for computing the rate of the metering pulses and for providing a metering pulse rate signal value indicative thereof;
A3. means for encoding a rate message which comprises a data field comprising said metering pulse rate signal value;
A4. means for transmitting said rate message over a wireless communication channel to the public call office;

B. a public call office comprising
B1. means for receiving said rate message and providing a received metering pulse rate signal value indicative thereof;
B2. a metering pulse generator which generates PCO metering pulses at a rate equal to said received metering pulse rate signal value; and
B3. means for counting said PCO metering pulses.

14. A wireless public call office which receives a rate message including a metering pulse rate signal value from a wireless local loop, the wireless public call office comprising:

means for receiving said rate message and providing a received metering pulse rate signal value indicative thereof;

a metering pulse generator which generates PCO metering pulses at a rate equal to said received metering pulse rate signal value;

means for counting said PCO metering pulses and providing an accumulated metering pulse signal value indicative thereof; and means for computing the cost of a call based upon said accumulated metering pulse signal value.

* * * * *